Feb. 9, 1943.   E. C. PITMAN   2,310,866
LUMINESCENT TUBE
Filed Feb. 25, 1941
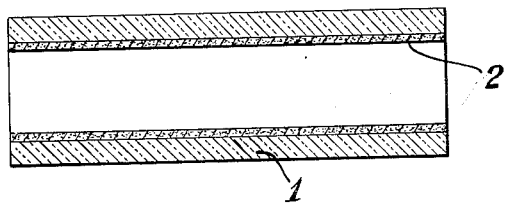
*Earle C. Pitman*   INVENTOR.
BY
Frank C. Hilberg  atty Patented Feb. 9, 1943

2,310,866

UNITED STATES PATENT OFFICE 2,310,866

LUMINESCENT TUBE

Earle C. Pitman, Red Bank, N. J., assignor to E. I. du Pont de Nemours & Company, Wilmington, Del., a corporation of Delaware Application February 25, 1941, Serial No. 380,455

11 Claims. (Cl. 176—122)

This invention relates to improved luminescent tubes employed for lighting purposes and more particularly to improved compositions adapted to deposit a thin, uniform coating of luminescent materials on the interior of such tubes.

In the manufacture of luminescent lighting tubes, various methods have been resorted to in depositing on the interior surface of such tubes a coating of a suitable luminescent material. The coated tube when provided with suitable electrodes and source of electrical energy affords an improved soft light. The luminescent material in finely divided form is usually applied to the tube interior by flowing a suspension of it in a volatile liquid vehicle. In some instances, the vehicle may be composed of volatile solvents and a solid film-forming material. In the event that the coating vehicle contains a film-forming ingredient such as nitrocellulose, the tube is subsequently subjected to a high baking temperature in order to burn off such materials leaving the luminescent particles deposited on the glass surface. An alternative method provides for the preliminary coating of the tube interior with a composition which remains tacky for a sufficient period to permit blowing of the finely divided luminescent material through the tube by means of an air blast, part of which is retained on the tacky film of the previously applied coating. These methods are subject to certain important defects including particularly a tendency for the coating to sag and exhibit an undesirable streaking effect after the tube is put in service.

This invention, therefore, has as an object the provision of a composition for coating the interior of glass tubes with a suspension of luminescent material which prevents sagging. Another object of the invention is the provision of a coating composition which affords greater uniformity in the deposition of the luminescent materials on the tube interiors. Another object is the provision of a composition for depositing luminescent materials on the interior of glass tubes without streaking. A further object is the provision of a vehicle for luminescent materials, a single application of which is usually sufficient. A still further object is the provision of a composition for coating the interior of glass tubes which permits the use of a lower non-volatile content, thus permitting a more ready and complete removal of the temporary binding medium during subsequent baking or burning-off of such material. Other objects will appear as the description of the invention proceeds.

These objects are accomplished by suspending or dispersing finely divided luminescent material in a vehicle comprising, as an essential ingredient, dynamite type nitrocellulose dissolved in a liquid volatile vehicle containing at least one solvent; the suspension being subsequently applied to the interior of glass tubes, dried, and finally heated at a sufficiently elevated temperature to remove the temporary binding medium. The viscosity of the nitrocellulose should be between about 40 seconds and 200 seconds in a 3 per cent acetone solution.

The term "dynamite" nitrocellulose is intended to mean the type of nitrocellulose commonly used for explosives. It is characterized in its extremely high viscosity and gel structure in suitable solvents, e. g., acetone. It differs from low viscosity or even so-called 1000 seconds viscosity nitrocellulose by its gel structure or false body characteristic and by the lack of any intentional treatment in its manufacture to reduce its viscosity characteristic. It will be noted that care is taken in the manufacture of dynamite nitrocellulose to avoid any substantial reduction in viscosity characteristic or destruction of gel structure property of the cellulose or cellulose nitrate.

Example 1

| | Per cent |
|---|---|
| Cellulose nitrate (dynamite type) | 0.5 |
| Alcohol (denatured) | 0.2 |
| Butyl acetate | 99.3 |
| | 100.0 |

This composition is prepared by combining the several ingredients in a suitable container and mixing by means of a conventional agitator mixer until the cellulose nitrate is dissolved.

The cellulose nitrate employed in this example is of the dynamite type cellulose nitrate manufactured according to methods well known in the art. In one method cotton linters previously subjected only to a very mild digestion at atmospheric pressure to remove oils and fats are nitrated at a temperature of 0–5° C. for a period of about 30 minutes with a nitrating acid mixture of which the following is typical:

| | Per cent |
|---|---|
| Nitric acid | 23.85 |
| Sulfuric acid | 56.91 |
| Nitrosyl sulfuric | 2.82 |
| Water | 16.42 |
| | 100.00 |

The nitrogen content of this type of cellulose nitrate is usually between about 12.15 and 12.35%. The product has an exceptionally high viscosity characteristic and ordinarily cannot be dissolved in volatile solvents and diluents in any considerable concentration. As an arbitrary (but necessary modification of the A. S. T. M. D-301-33) measure of the viscosity characteristic of this type of cellulose nitrate, the cellulose nitrate of Example 1 was dissolved in acetone in the proportion of 3% by weight. This is because a 12.2% solution as called for by the A. S. T. M. method could not be made. The viscosity of this solution determined in accordance with the modified falling ball method was 95.2 seconds. A similar determination on a heavy coating type cellulose nitrate, which had a viscosity characteristic of 1,090 seconds in Formula A of A. S. T. M. specifications D-301-33, had a viscosity of only 0.3 second for a 3% solution in acetone. Another test was made on a similar high viscosity nitrocellulose of a viscosity of 4670 seconds (A. S. T. M. Formula A) and a value of 0.5 second was obtained. These figures are directly comparable and illustrate the extremely high viscosity characteristic of the dynamite type cellulose nitrate as compared to a so-called high viscosity dope type cellulose nitrate commonly employed for coating purposes.

The above vehicle may be combined with any of the commonly available fluorescent type pigments such as cadmium, magnesium, calcium or zinc tungstate by grinding the mixture in a pebble mill for from 3 to 10 hours or for a sufficient time to reduce the luminescent material to the required fine particle size, preferably of the order of that which will pass through a 400 mesh screen. A suitable proportion of pigment to vehicle in the grinding charge is about 1 part by weight of luminescent material to about 1½ parts by weight of vehicle. To facilitate removal of the charge additional volatile solvent or vehicle, for example, about 2 parts by weight, may be placed in the mill and the mill rotated briefly to form a homogeneous mixture after which the charge can readily be removed.

The suspension may then be further diluted if desired with suitable solvents and thinners to afford a consistency such that the composition may be flowed through the tube in accordance with common practice. A satisfactory ratio of pigment to dynamite cellulose nitrate is 30:1. This proportion may be varied considerably although in general, it is preferred to keep the temporary binding non-volatile material as low as possible and in some instances the luminescent material may be increased to upwards of 100:1 or more with acceptable results. The application of one coat of this composition suffices for most purposes, thus affording economical advantages over prior practice which required the application of two or more coats. In applying this composition the elimination of sagging which characterized earlier coatings of this type is particularly noticed.

The volatile solvents are evaporated and the coated tube subjected to elevated temperatures, for example, on the order of about 300° C. to burn off the temporary binding medium, leaving only the fluorescent material deposited uniformly and without any indication of streaking on the interior of the glass tube.

The coated tube may then be filled with a suitable gas such as argon, neon, krypton, etc., together with a small amount of mercury and capped and connected at each end with conventional conductors for attachment to a source of electrical energy, thereby providing an improved fluorescent light tube.

*Example 2*

| | Per cent |
|---|---|
| Cellulose nitrate (dynamite type) | 1.0 |
| Alcohol (denatured) | 0.5 |
| Methyl acetate | 73.5 |
| Hexane | 25.0 |
| | 100.0 |

The cellulose nitrate in this example was of the same type as described in Example 1.

The preparation of the vehicle, its combination with luminescent materials and the application of the composition containing the suspended luminescent material to the interior of glass tubes may be accomplished in accordance with the procedure of Example 1. This example illustrates the use of a highly volatile hydrocarbon, namely, hexane, which facilitates more rapid evaporation of the volatile solvents and further enhances the non-sagging character of the vehicle based on the use of dynamite type cellulose nitrate.

In general, in order to afford an operable coating vehicle, the proportion of the dynamite type cellulose nitrate should not exceed about 3% by weight of the vehicle, and to provide suitable temporary binding effects should be present in an amount not substantially less than about 0.2%. Also, it is possible to use a mixture of dynamite type cellulose nitrate and a cellulose nitrate selected from the group commonly employed for coating purposes, preferably of high viscosity characteristic, but such addition or partial substitution should be in minor proportion and certainly not in sufficient quantity to adversely affect the "false body" property of the dynamite type cellulose nitrate. Although compositions such as those shown in the examples are entirely satisfactory, in some cases it may be desired to improve adhesion and reduce shrinkage when the film is applied by the addition of plasticizers and resins or both in small amounts. The composition is not limited with respect to volatile solvents and diluents since other materials of the type illustrated in the examples including esters and ketones, such as ethyl acetate, acetone, methyl ethyl ketone, and diluents such as butyl alcohol, toluol, etc., may be used provided sufficient active solvent is present to afford complete solution of the cellulose nitrate.

The invention is also not limited to any particular luminescent material since similar results may be obtained with the use of any of the commonly available luminescent materials which may be used singly or in combinations.

The strikingly improved results of the present invention are derived from the use of dynamite type cellulose nitrate as the essential ingredient in the liquid vehicle in which the luminescent material is suspended. While I do not wish to be bound by any explanation or theory, at present it appears that the unusually high viscosity characteristic of the dynamite type cellulose nitrate contributes in a minor way to the elimination of sagging and streaking tendencies in the coating, but the major effect is secured through the unique property of this type of cellulose nitrate when dissolved in suitable solvent vehicle consisting of a definite critical yield point resembling that of those plastic materials or paints which sometimes exhibit "false body." It is probably this property which causes the composition to set quickly on the sides of the glass tube without sagging, thus differing in an important and fundamental way from other types of cellulose nitrate commonly employed for coating purposes. If a conventional high viscosity cellulose nitrate which does not possess this "false body" characteristic is used at a concentration sufficiently high to give an equivalent apparent viscosity in the vehicle, streaking tendencies still result.

The new compositions find particular merit in connection with the manufacture of ceramic ware and luminescent light tubes which have heretofore been defective with respect to streaking effects that are clearly visible in the finished tube.

The advantages of the compositions of the present invention are several. Of primary importance is the elimination of sagging tendencies following application of the coating to the interior of glass tubes. This non-sagging property is reflected in the equally important elimination of streaking effects in the final tube assembly and in its subsequent operation. Greater uniformity of coating is also assured. As previously suggested, the application of a single coat suffices for most purposes, thus providing substantial operating and raw material economies. In addition, the invention also permits the use of smaller amounts of cellulose nitrate than has heretofore been possible, thus permitting a more ready and complete removal of all contamination in the final tube and affording a product of superior quality.

In the drawing the single figure is a diagrammatic section of a luminescent lamp made in accordance with the present invention. In the figure, 1 is a glass tube and 2 is a coating of luminescent pigment deposited as disclosed above.

It is apparent that many widely different embodiments of the invention may be made without departing from the spirit and scope thereof; and, therefore, it is not intended to be limited except as indicated in the appended claims.

I claim:

1. A coating composition adapted to depositing a thin uniform film in luminescent light tubes comprising a liquid vehicle containing dynamite cellulose nitrate as an essential ingredient, a solvent therefor and a suspension therein of a luminescent material said cellulose nitrate having received no treatment for substantially reducing its viscosity characteristic.

2. The composition of claim 1 in which the luminescent material and cellulose nitrate are present in the proportion of about 30 parts by weight of luminescent material to about 1 part of cellulose nitrate.

3. The composition of claim 1 in which the viscosity of the dynamite cellulose nitrate in a 3% acetone solution is between about 40 seconds and 200 seconds.

4. The composition of claim 1 in which the viscosity of the dynamite type cellulose nitrate in a 3% acetone solution is about 95 seconds.

5. The composition of claim 1 in which the ratio of luminescent material to cellulose nitrate is between 30:1 to about 100:1.

6. The product of claim 1 in which the nitrogen content of the cellulose nitrate is between 12.15 and 12.35 per cent and the viscosity is between 40 and 200 seconds.

7. An improved luminescent light tube comprising a glass tube having on its interior surface a uniform coating of luminescent material deposited from a suspension of said luminescent material in a liquid vehicle containing dynamite cellulose nitrate as an essential ingredient which has received no treatment for substantially reducing its viscosity characteristic, said vehicle being finally removed by heating at a temperature sufficient to decompose said cellulose nitrate.

8. The process of preparing luminescent lighting tubes which comprises the improvement of applying a thin film of a composition containing dynamite cellulose nitrate which has received no treatment for substantially reducing its viscosity characteristic, solvent, and luminescent pigment, allowing the solvent to evaporate, and thereafter heating the tube to about 300° C. to burn off the cellulose nitrate.

9. In the process of preparing luminescent tubes in which a thin film of luminescent material is deposited on the interior of the tube, the improvement which comprises applying to the inside of the tube a composition containing dynamite cellulose nitrate which has received no treatment for substantially reducing its viscosity characteristic and luminescent material in the proportion of about 30 parts of luminescent material to each part of cellulose nitrate in the said composition.

10. The composition of claim 1 in which the nitrocellulose is the sole film-forming ingredient.

11. A coating composition adapted to deposit a thin uniform film in a luminescent light tube comprising a liquid vehicle containing dynamite cellulose nitrate which in its manufacture has had no treatment for reducing its viscosity characteristic, a solvent therefor and a suspension therein of a luminescent material.

EARLE C. PITMAN.